United States Patent [19]

Wisniewski

[11] Patent Number: 4,744,151

[45] Date of Patent: May 17, 1988

[54] SURVEYING EQUIPMENT

[76] Inventor: Walter W. Wisniewski, P.O. Box 5254, Carefree, Ariz. 85377

[21] Appl. No.: 10,960

[22] Filed: Mar. 30, 1987

[51] Int. Cl.[4] .......................... G01B 3/04; G01B 5/08; G01B 5/12
[52] U.S. Cl. .................................. 33/173; 33/178 R; 33/490
[58] Field of Search ..................... 33/173, 178 R, 478, 33/484, 485, 490, 542

[56] References Cited

U.S. PATENT DOCUMENTS

| | | | |
|---|---|---|---|
| 1,529,210 | 3/1925 | Parker | 33/490 |
| 2,199,235 | 4/1940 | Ashel | 33/173 |
| 2,649,784 | 8/1953 | Klimek | 33/173 |
| 2,957,246 | 10/1960 | Sorensen | 33/173 |
| 3,913,232 | 10/1975 | Marcell | 33/490 |
| 3,995,373 | 12/1976 | Brumbelow | 33/178 R |
| 4,536,960 | 8/1985 | Muti | 33/178 R |

Primary Examiner—Richard R. Stearns

[57] ABSTRACT

A measuring assist device which attaches to a surveying or measuring rod to aid in, but not limited to, measuring the depths (inverts) and/or sizes (inside or outside diameters) of pipes within structures such as manholes, catch basins, inlets, valve vaults, etc.

4 Claims, 1 Drawing Sheet

U.S. Patent May 17, 1988 4,744,151
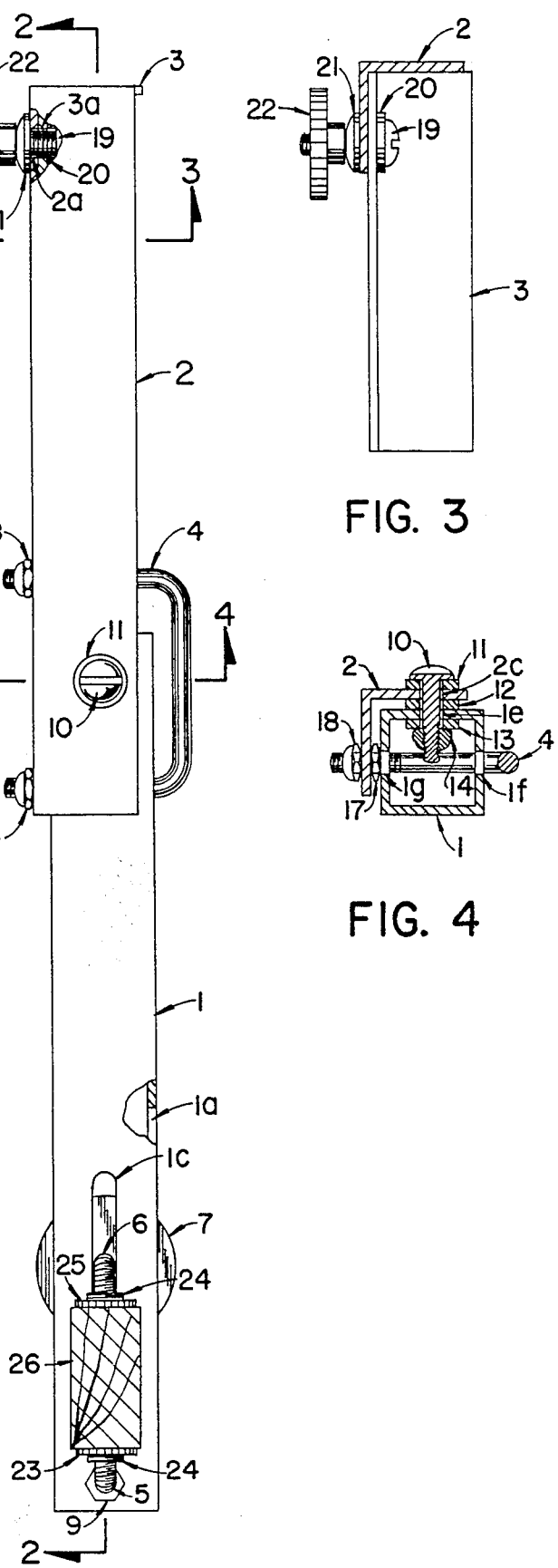
FIG. 3
FIG. 4
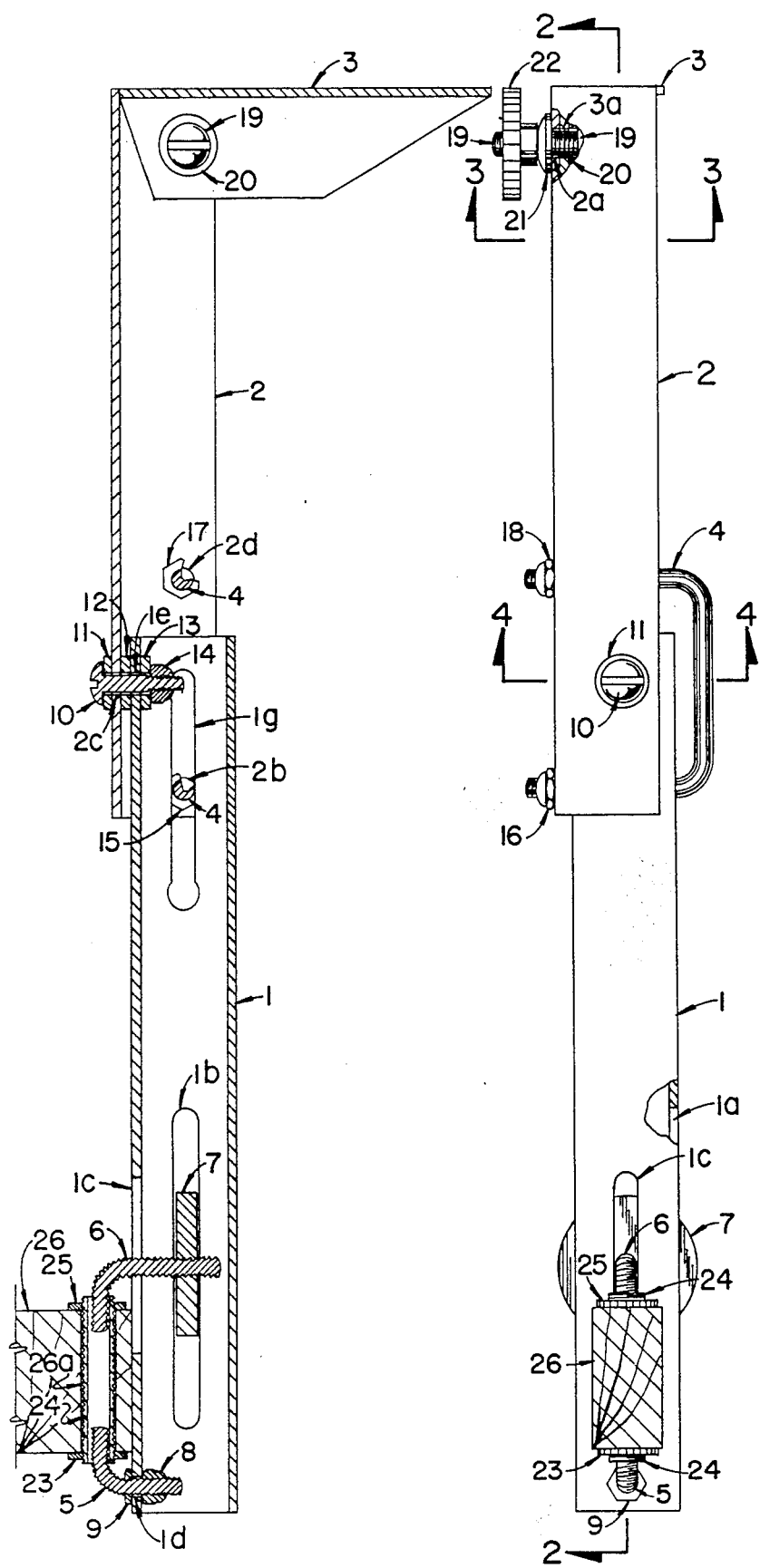
FIG. 2   FIG. 1

SURVEYING EQUIPMENT

SUMMARY

It is well known within the field of land surveying that measuring the depths (inverts) and/or sizes (inside or outside diameters) of pipes within structures such as manholes, catch basins, inlets, valve vaults, etc., is to be done with as much accuracy as possible in order that the information obtained through those measurements can be applied in the design of new sanitary sewer systems, storm sewer systems and/or watermain systems, or in the renovation of existing systems. Unfortunately the methods of obtaining these measurements are usually far from being accurate, which in turn mislead those who are trying to: (1) determine the existing capacities of said system, (2) determine the proper location for extending a new system from an existing system, or (3) verify another person's work in the construction of a new system.

All three circumstances stated above are reasons why obtaining accurate measurements is necessary. In order to understand why the usual methods of measuring are inaccurate, an explanation on the standard practices of obtaining measurements for pipe inverts is described in the following paragraphs.

One such method is to take a metal measuring tape weighted at its end and lower it into a manhole until the end of the tape hits the bottom of the structure. The measurement is read at the top (rim) of the manhole and the depth recorded. The problem with this method is that the pipe or pipes connected to the side of the manhole were not measured at all. What was measured was the depth at the center, or the approximate center, of the manhole. When these measurements are consistently taken in this manner from manhole to manhole of the same system, and the elevations are determined from a commonly-known point, the true pipe slopes between the manholes of the system(s) are not determined because it was an average depth in each manhole that was obtained and not a true depth of each pipe.

A second method is to measure a pipe depth directly with a surveying rod. The reason this method can yield an inaccurate measurement is that if the actual vertical depth of the pipe is eight feet, but the pipe is two feet from being vertically inline with the manhole opening, then by Pathagorean's theorem, the hypotenus, being the direct line from the manhole opening to the beginning of the pipe's bottom, or in this case the position of the surveying rod measured at 8.25 feet, is a full 0.25 feet from being the correct vertical depth (invert) of the pipe.

Conventional methods of measuring the diameters of these same pipes as described above can result in inaccuracies. The following paragraphs describe three methods illustrating these inaccuracies.

One method of determining the pipe diameter is simply by looking at it from on top of the manhole and stating the size of the diameter. The accuracy of this method is judgmental, but it is also based on what the observer believes he is truly seeing. Most pipes used in sanitary sewer, storm sewer and watermains have one end which is called a bell and another which is called the barrel. The problem with observation is that the bell end fits over the barrel end of pipe, so that the actual design diameter of the pipe, the barrel end, can be misinterpreted as being a larger diameter pipe if the observer is actually looking at the bell end from on top of the manhole. The reason for this is that the observer's line of sight to the pipe usually does not lend itself to seeing far enough into the pipe to know whether he is looking at the bell end or the barrel end of the pipe.

A second method of determining the diameter of a pipe in a manhole is by inserting a surveying rod down a manhole and placing it on the bottom of the pipe. The length of the rod is recorded. The rod is then moved upward and placed on top of the pipe and a second measurement is recorded. The two recorded measurements are subtracted and the result is considered to be the diameter of the pipe. The accuracy of this second method is also judgmental, because the surveyor may not know whether he's measuring the bell or barrel end. The pipe may also be flush with the side of the manhole, making it impossible to take a top measurement.

A third method of determining the diameter of a pipe in a manhole is by physically going down into the manhole and measuring the pipe's diameter by using a tape measure or carpenter's rule, etc. The problem with this method is that it is not always possible to go down into the manhole. A few of the reasons for this are as follows: (1) steps leading down into the manhole may not exist, either because they broke off or were never put in place when the manhole was manufactured, (2) the manhole may be partially filled with water or sewage back-up, and (3) the sewage fumes may be too overpowering for it to be safe to enter into the manhole.

The purpose of the measuring assist device is to measure depths and/or diameters of pipes inside manholes. The method of accomplishing said measuring is by utilizing a hinged device which can be attached to the base of a measuring rod and opened to approximately twice its size once inside a structure, i.e., manhole, inlet, etc., and resists vertical deflection once the measuring assist device is in use.

The measuring of inverts and diameters of these pipes is accomplished by inserting the end of the measuring assist device into the pipe and allowing it to rest on the pipe's lowest point. At this time the surveying (or measuring) rod is held vertically and a reading of the rod is recorded. Allowing for the thickness of the measuring assist device, the actual depth of the pipe can be calculated. The diameter of the same pipe is measured by lifting the rod until it stops against the crown (inside top of pipe). The rod is held vertically at this time and a second reading of the rod is taken and recorded. With measurements recorded, and taking into account the thickness of the measuring assist device, the difference is the inside diameter of the pipe.

Therefore, my intention is to alleviate the described problems of measuring by utilizing a measuring assist device which would be attached to the base of a surveying rod or similar measuring instrument.

IN THE DRAWING

FIG. 1 is a top view of the measuring assist device, a cross-sectional view of a rectangular measuring rod, a fragmentary cross-sectional view of the angle foot assembly, and a fragmentary cross-sectional view showing slot 1a.

FIG. 2 is a side cross-sectional view taken on line 2—2 of FIG. 1, and fragmentary cross-sectional views showing holes 2b and 2d.

FIG. 3 is a cross-sectional view taken on line 3—3 of FIG. 1.

FIG. 4 is a cross-sectional view taken on line 4—4 of FIG. 1.

BEST WAY TO CARRY OUT INVENTION

The measuring assist device 1-22 as shown in FIGS. 1 through 4 consists of the modification assembly 23-26 and the following main components: a square member 1, an angle member 2, and an angle foot member 3. Each said member consists of subcomponents which enable the measuring assist device 1-22 to function as a whole unit.

Components 23 through 25, for modifying a measuring rod 26, allow the measuring assist device 1-22 to attach itself to said measuring rod 26.

A method of accomplishing this modification is to first drill or provide a horizontal hole 26a near the base of said measuring rod 26. A threaded tube 24 of proper size is placed through the hole 26a of the measuring rod 26. Two washer-type nuts 23 and 25 are placed and tightened on the ends of the threaded member 1. The longer leg of the 90° threaded rod 6 is inserted through the top slot 1c of the square member and through the threaded disk 7 just below.

The second half of the clamping mechanism (the 90° threaded rod 6 in conjunction with the threaded disk 7), can adjust the longer leg of the 90° threaded rod 6 vertically up or down by turning the threaded disk 7 counterclockwise or clockwise.

The second half of said clamping mechanism can move freely in a horizontal direction within the confines of slots 1a, 1b and 1c.

Attaching the modified measuring rod 22-26a to the square member 1 with said clamping mechanism of the measuring assist device 1-22 is described as follows:

The 90° threaded rod of clamping mechanism 5-9 is adjusted such that the underside short leg of the 90° threaded rod 5 is just above the bottom of the inside diameter of the threaded tube 24 on the modified measuring rod 23-26a. The modified measuring rod 23-26a, being between the two 90° threaded rods, is moved horizontally toward the short leg of the 90° threaded rod 5 until the threaded tube 24 meets the inside curve of the 90° threaded rod 5. The second half of the clamping mechanism 6 and 7 is moved along the horizontal slots 1a, 1b and 1c toward the opposite opening of the threaded tube 24. The short leg of the 90° threaded rod 6 is pointed toward said opening of the threaded tube 24 and inserted into said threaded tube 24. The threaded disk is turned clockwise on the long leg of the 90° threaded rod 6, drawing the tube 24. The threaded tube 24 is now secured on the measuring rod 26.

The modification assembly 23-25 and 26a can accommodate any cross-sectional shape, including the rectangular shape of the measuring rod 26 as shown in FIG. 1.

The modification assembly on the measuring rod 26 is complete and ready to be attached to the measuring assist device 1-22, by way of the clamping mechanism.

The first half of the clamping mechanism 5-9 begins with a 90° threaded rod 5 of proper size. A nut 9 of proper size is placed on the longer leg of said 90° threaded rod 5. Said rod 5 is inserted through hole 1d, which is located on the top side and near one end of the square member 1. A lock nut 8 of proper size is then placed and tightened on the same longer leg of said rod 5. The shorter leg of said rod 5 is to point in the same direction as the square member 1.

Said 90° threaded rod assembly 1, 1d, 5, 8 and 9 can be adjusted vertically up or down in order to accommodate said threaded tube 24 by adjusting nuts 8 and 9.

The second half of the clamping mechanism 5-9 consists of two parts. The first part is a second 90° threaded rod 6 of proper size and the second part is a threaded disk 7 of proper size.

The threaded disk 7 is inserted through two properly sized horizontal slots 1a and 1b in the vertical sides of the square member 1. The threaded disk 7 is centered between the two slots 1a and 1b, such that one's fingers may grasp the outside surface of the threaded disk 7. Directly above the centered threaded disk 7 is a properly sized slot 1c, which is located on the top side of the square modified measuring rod 23-26a against the square member 1. At the same time, the top of the threaded disk 7 is secured against the top of slots 1a and 1b. The modified measuring rod 23-26a is now secured on the measuring assist device 1-22 with the clamping mechanism 5-9.

The square member 1 and the angle member are connected by two sub-assemblies made up of components 10 through 14; and 4 and 15 through 18, constituting the main hinge. First a hole 1e of proper size is provided on the top side of said square member 1. Said hole is on the end opposite the clamping mechanism. A second hole 2c of proper size is provided on the top and near one end of the angle member 2. The two holes 1e and 2c are centered to each other. A washer 11 of proper size is centered on top of hole 2c. A second washer 12 is centered between holes 2c and 1e. A sleeve bolt 10 of proper size is placed through washer 11, hole 2c, washer 12, hole 1e and washer 13. A lock nut 14 of proper size is placed and tightened on the threaded end of said sleeve bolt 10. The first sub-assembly of the main hinge is complete.

The second sub-assembly consists of two slots 1f and 1g of proper size placed horizontally in the vertical sides of said square member 1. Said slots are on the end opposite the clamping mechanism 5-9. Said slots 1f and 1g consist of a longitudinal hole which has a larger diameter opening of proper size at one end.

The diameter of hole 2b and 2d, on the angle member 2, is the same size as the larger diameter opening of said slot 1f and 1g. Holes 2b and 2d are placed equidistant and on the opposite side of said angle member's hole 2c. Said holes 2b and 2d are diametrically centered with said slots 1f and 1g. One threaded leg of a 'U'-shaped member 4 of proper size is placed through the larger diameter ends of slots 1f and 1g. Nuts 15 and 17 of proper size are placed and tightened up to the end of the threads on each leg of said 'U'-shaped member 4. Each threaded leg of said 'U'-shaped member 4 is placed through holes 2b and 2d of said angle member 2. Lock nuts 16 and 18 of proper size are placed and tightened on the ends of the threaded legs of said 'U'-shaped member 4. The main hinge assembly 10 through 18 and 4 is complete.

Said main hinge assembly 10 through 18 and 4 allows said angle member 2 to rotate around said sleeve bolt 10 a full 180°.

Said main hinge assembly 10 through 18 and 4 has a counter leverage system as part of its function. The counter leverage system is a triangle made up of imaginary lines drawn from hole 2c to slot 1f at 'U' member 4, from slot 1f at 'U' member 4 to slot 1g at 'U' member 4, and from slot 1g at 'U' member 4 back to hole 2c. Anytime a vertical force is applied on top or on the bottom at the end of said angle member 2, the force is transferred to the top or bottom of slots 1f and 1g through the 'U' member 4, thereby lessening the amount of deflection said angle member 2 would ordinarily receive if only connected by said sleeve bolt assembly 10-14. Therefore, said counter leverage system enhances the accuracy of the measuring assist device by reducing deflection potential.

During its use, said measuring assist device will be subjected to torsion and vertical forces. Said forces will be applied near the end of said angle member 2 when used to assist in measuring the inverts and diameters of pipes in structures.

The geometric combination of parts subjected to said forces is the square member 1, the main hinge 10-18 and 4, and the angle member 2. The square member 1, because of it's cross-sectional shape, resists torsion which it is subjected to anytime the angle member 2 is less than 180° in relation to the square member 1. This resistance to torsion allows for more accurate measuring. The square member also resists vertical deflection due to its vertical sides. The angle member 2 will encounter only vertical forces. Said angle member, having a vertical side leg, will act similarly to an I-beam, thereby being able to resist vertical deflection when said forces are applied. The less deflection that takes place, the greater accuracy in measurements.

The final assembly, which includes the angle foot member 3, rotates downward in a vertical plane, providing a 90° angle between the angle foot member 3 and the angle member by having the angle foot member 3 stop on the top underside portion of the angle member 2. A bolt 19 is inserted through washer 20, hole 3a, hole 2a, lock washer 21 and knurled nut 22. When the angle foot member 3 is fully extended, the knurled nut 22 is turned clockwise until all components 2, 3 and 19-22 are tightly in place. The angle foot member assembly is now ready to obtain an accurate pipe invert or diameter in the downstream side of a concrete trough transition base of manholes or inlets.

Said measuring assist device 1-22, being fully assembled, and said surveying or measuring rod being fully modified, the two are now assembled.

The measuring of pipe inverts and their diameters in assorted structures can now be accomplished more accurately than in previous conventional methods.

When ready to take measurements in a structure, the first step is to attach said measuring assist device to said modified surveying or measuring rod by using said clamping mechanism as previously stated.

Secondly, the measuring assist device is to be in a closed position. In other words, the angle foot member and the angle member are to be in contact with the square member.

Thirdly, the measuring assist device is lowered through the opening of the structure by way of the surveying or measuring rod.

Fourthly, depending on the size and type of structure, the pipe or pipes can have their inverts and diameters measured with the measuring assist device in the closed position.

The invert is measured by inserting the measuring assist device into the pipe opening at least six inches, (if the pipe opening is the bell end, this distance will usually take you into the barrel end), and lowering the measuring assist device until you can feel that it has hit the bottom of the pipe. The surveying or measuring rod is to be held vertically and a reading of the rod at the rim of the structure is to be taken and recorded. Allowing for the thickness of the measuring assist device, the correct invert of the pipe is determined.

In order to obtain the diameter of the same pipe, the surveying or measuring rod is lifted up until the measuring assist device is hitting the inside crown of the pipe. The surveying or measuring rod is again to be held vertically and a reading of the rod at the rim of the structure is to be taken and recorded. The two recorded readings are subtracted. Allowing for the thickness of the measuring assist device, the correct diameter of the pipe is determined.

When the structure is too large for its pipes to be measured with the measuring assist device closed and/or the type of structure does not lend itself to being measured unless the angle foot member is extended, then alternate steps are to be taken when measuring pipe inverts and their diameters.

Starting with the second step, instead of the measuring assist device remaining completely closed, the measuring assist device will be in an almost closed position such that the angle foot member is extended fully and locked into place.

Thirdly, the measuring assist device is again lowered through the structure's opening by way of the surveying or measuring rod.

Fourthly, the measuring assist device is then opened by twisting the surveying or measuring rod with a quick motion in the direction to which the measuring assist device will open. The momentum given by this action to the end of the measuring assist device will allow it to swing open to it's full 180° extension.

Fifthly, the pipe or pipes within the structure can have their inverts and diameters measured.

Sixthly, the measuring of an invert of a pipe in a trough transition base at it's downstream end is the main reason for having the angle foot member. The pipe invert is measured by inserting the extended angle foot member approximately six inches into the pipe, and lowering the measuring assist device until you can feel that it has hit the bottom of the pipe. The surveying or measuring rod is to be held vertically and a reading of the rod at the rim of the structure is to be taken and recorded. Allowing for the combined length and thickness of the angle foot member and measuring assist device, respectively, the correct invert of the pipe is determined.

In order to obtain the diameter of the same pipe, the surveying or measuring rod is lifted up until the measuring assist device is hitting the inside crown of the pipe. The surveying or measuring rod is again to be held vertically and a reading of the rod at the rim of the structure is to be taken and recorded. The two recorded readings are subtracted. Allowing for the combined length and thickness of the angle foot member and measuring assist device, respectively, the correct diameter of the pipe is determined.

Another advantage of the measuring assist device is that if the pipes within a structure are hidden from view, i.e., there is water or sewage back-up, the measuring assist device can be used as a probe along the side(s) of the structure, until a pipe opening has been found. Once the pipe opening has been found, the direction of the measuring assist device will indicate the direction of the pipe's next structure or outfall.

Measuring of the pipe invert and diameter, probing for a hidden pipe opening, and determining the direction of the pipe are all accomplished from on top of the structure, rather than in it.

While one embodiment of the invention has been described, it will be apparent to those skilled in the art that the described form may be modified. Therefore, the foregoing description is to be considered exemplary rather than limiting, and the true scope of the invention is defined in the following claims:

I claim:

1. A device for use on one end of a measuring rod for measuring remotely located pipe, said device comprising:
   (a) A first elongated member having a distal end and a proximal end;
   (b) Clamping means on the proximal end of said first elongated member for demountable attachment to the one end of the measuring rod, said first elongated member being in a normal relationship with the measuring rod when attached thereto by said clamping means;
   (c) A second elongated member having a proximal end which is pivotably mounted on the distal end of said first elongated member for movement in an arcuate path with the movement being in the plane normal to said measuring rod; and
   (d) A foot depending from the distal end of said second elongated member.

2. A device as claimed in claim 1 wherein said clamping means comprises:
   (a) A first slot formed transversely through said first elongated member and extending longitudinally of said first elongated member;
   (b) A disc mounted in the first slot of said first elongated member with portions thereof protruding laterally and oppositely from said first elongated member for manual manipulation to rotate said disc in the slot of said first elongated member; said disc having an internally threaded bore formed centrally therethrough;
   (c) Said first elongated member having a second slot opening substantially normal onto the transverse plane of the first slot thereof;
   (d) A hook means mounted through said first elongated member's second slot into said disc, providing confined movement of said hook means and disc within said first elongated member's slots;
   (e) Said first elongated member having a first hole formed therethrough in the same plane of said first elongated member's second slot being at the proximal end and in alignment thereof; and
   (f) A second hook means mounted in said first elongated member's first hole therein; said second hook mean's demountable end facing the distal end of said first elongated member.

3. A device as claimed in claim 1 wherein said first elongated member's distal end and said second elongated member's proximal end have a mounted pivotable means; said pivotable means comprising;
   (a) Said first elongated member having a formed hole vertical, in relation to said measuring rod, therethrough at it's distal end;
   (b) Said second elongated member having a formed hole vertical, in relation to said measuring rod, therethrough at it's proximal end;
   (c) A fastener means mounted therethrough said second elongated member's hole at it's proximal end and said first elongated member's hole at it's distal end; thereby allowing for movement in an arcuate path;
   (d) Said first elongated member having a slot formed therethrough transversely and normal to said first elongated member's hole at it's distal end;
   (e) Said second elongated member having two formed holes horizontally aligned being normal to and on either side to said second elongated member's hole at it's proximal end; and
   (f) A U-shaped member mounted therethrough said first elongated member's slot at it's distal end to said second elongated member's horizontally aligned two holes of it's proximal end; thereby in part counteracting forces of deflection when said measuring device is employed for it's intended use and in part maintains the planar relationship of said first elongated member to said second elongated member.

4. A device as claimed in claim 1 wherein said foot comprises:
   (a) Said second elongated member having a formed hole horizontally therethrough at it's distal end;
   (b) A foot member having a formed hole horizontally therethrough it's proximal end; and
   (c) A fastener means mounting said foot to the distal end of said second elongated member for pivotable movement between a normally extending position and a folded position.

* * * * *